(12) United States Patent
Ramkumar et al.

(10) Patent No.: US 9,094,904 B2
(45) Date of Patent: Jul. 28, 2015

(54) ADAPTIVE MAINTENANCE OF UPLINK TIME ALIGNMENT

(71) Applicant: QUALCOMM Incorporated, San Diego, CA (US)

(72) Inventors: Vasanth Kumar Ramkumar, San Diego, CA (US); Srinivasan Rajagopalan, San Diego, CA (US); Bao Vinh Nguyen, San Diego, CA (US); Deepak Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 13/793,062

(22) Filed: Mar. 11, 2013

(65) Prior Publication Data

US 2014/0119247 A1    May 1, 2014

Related U.S. Application Data

(60) Provisional application No. 61/718,554, filed on Oct. 25, 2012.

(51) Int. Cl.
    *H04L 12/28*     (2006.01)
    *H04W 56/00*     (2009.01)
    *H04J 1/16*     (2006.01)

(52) U.S. Cl.
    CPC ...... *H04W 56/0005* (2013.01); *H04W 56/0045* (2013.01)

(58) Field of Classification Search
    USPC .......................................... 370/329, 350, 510
    See application file for complete search history.

(56) References Cited

U.S. PATENT DOCUMENTS

| | | | |
|---|---|---|---|
| 4,086,537 A * | 4/1978 | Asakawa et al. ............... 370/510 |
| 8,274,969 B2 | 9/2012 | Wu |
| 2005/0232292 A1* | 10/2005 | Richards et al. .............. 370/432 |
| 2009/0232107 A1 | 9/2009 | Park et al. |
| 2011/0200032 A1 | 8/2011 | Lindstrom et al. |
| 2012/0257601 A1 | 10/2012 | Kim et al. |
| 2012/0281566 A1* | 11/2012 | Pelletier et al. ................ 370/252 |
| 2013/0046899 A1* | 2/2013 | Harrington et al. ........... 709/230 |
| 2013/0279493 A1* | 10/2013 | Yi et al. ......................... 370/350 |

FOREIGN PATENT DOCUMENTS

WO    WO-2011087416 A2    7/2011
WO    WO-2012134072 A2    10/2012

OTHER PUBLICATIONS

International Search Report and Written Opinion—PCT/US2013/065934—ISA/EPO—Jan. 28, 2014.
(Continued)

*Primary Examiner* — John Pezzlo
(74) *Attorney, Agent, or Firm* — Austin Rapp & Hardman (57) ABSTRACT

A method for wireless communication is disclosed. A time alignment timer is started. It is determined when the time alignment timer will expire. A time alignment request subframe that is prior to the time alignment timer expiring is identified. Uplink time alignment is requested in the time alignment request subframe.

31 Claims, 8 Drawing Sheets

(56) References Cited

OTHER PUBLICATIONS

"LTE; Evolved Universal Terrestrial Radio Access (E-UTRA); Medium Access Control (MAC) protocol specification (3GPP TS 36.321 version 11.0.0 Release 11)", Technical Specification, European Telecommunications Standards Institute (ETSI), 650, Route Des Lucioles; F-06921 Sophia-Antipolis; France, vol. 3GPP RAN 2, No. V11.0.0, Oct. 1, 2012, XP014075779, p. 17, paragraph 5.2 -p. 18.

* cited by examiner

| Time Division Duplex (TDD) System 524 | SF#0 | SF#1 | SF#2 | SF#3 | SF#4 | SF#5 | SF#6 | SF#7 | SF#8 | SF#9 |
|---|---|---|---|---|---|---|---|---|---|---|
| | Downlink | Downlink | Uplink | MBSFN | MBSFN | Downlink | Downlink | MBSFN | MBSFN | MBSFN |
| System Frame # 0 | | | Wireless communication device pre-emptively initiates RACH procedure 532 | | Time alignment timer expires 530 | Earliest possible timing alignment command 534 | | | | |

Subframe 528

System Frame 526

Time Alignment Request Subframe 518

Time Alignment Timer Expiration Subframe 516

FIG. 5

| Subframe 628 | | | | | | | | | |
|---|---|---|---|---|---|---|---|---|---|
| | SF#0 | SF#1 | SF#2 | SF#3 | SF#4 | SF#5 | SF#6 | SF#7 | SF#8 |
| Frequency Division Duplex (FDD) System *636* | Downlink/ Uplink | MBSFN/ Uplink | MBSFN/ Uplink | MBSFN/ Uplink | Downlink/ Uplink | Downlink/ Uplink | MBSFN/ Uplink | MBSFN/ Uplink | MBSFN/ Uplink |
| System Frame # 0 | | | | Time alignment timer expires *640* | Wireless communi- cation device initiates RACH procedure *642* | | | Earliest possible timing alignment command *644* | |

System Frame 626

Time Alignment Timer Expiration Subframe 616

Time Alignment Request Subframe 618

FIG. 6

| | SF#0 | SF#1 | SF#2 | SF#3 | SF#4 | SF#5 | SF#6 | SF#7 | SF#8 |
|---|---|---|---|---|---|---|---|---|---|
| Frequency Division Duplex (FDD) System 736 | Downlink/ Uplink | MBSFN/ Uplink | MBSFN/ Uplink | MBSFN/ Uplink | Downlink/ Uplink | Downlink/ Uplink | MBSFN/ Uplink | MBSFN/ Uplink | MBSFN/ Uplink |
| System Frame # 0 | | Wireless communication device pre-emptively initiates RACH procedure 742 | | Time alignment timer expires 740 | Earliest possible timing alignment command 744 | | | | |

System Frame 726

Subframe 728

Time Alignment Request Subframe 718

Time Alignment Timer Expiration Subframe 716

ADAPTIVE MAINTENANCE OF UPLINK TIME ALIGNMENT

CROSS-REFERENCE TO RELATED APPLICATIONS

This application is related to and claims priority from U.S. Provisional Patent Application Ser. No. 61/718,554, filed Oct. 25, 2012, for "ADAPTIVE MAINTENANCE OF UPLINK TIME ALIGNMENT."

TECHNICAL FIELD

The present disclosure relates generally to wireless communication systems. More specifically, the present disclosure relates to systems and methods for adaptive maintenance of uplink time alignment.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smartphones, computers, etc.) communicate with other electronic devices. For example, a wireless communication device (e.g., cellular phone, smartphone, etc.) may wirelessly communicate with a base station and vice-versa. This may enable the wireless communication device to access and/or communicate voice, video, data and so on.

Some electronic devices are capable of communicating using multiple different technologies. These electronic devices may switch the technology used when another technology becomes available (such as from a different base station) or when circumstances warrant a switch (such as a need for a higher data transfer rate). These electronic devices may need to adjust communication settings that are used when such a switch occurs. As can be seen from this discussion, systems and methods that improve the switching capabilities of the electronic devices may be beneficial.

DETAILED DESCRIPTION

Wireless devices may be required to maintain uplink timing alignment with a network. A wireless device does this by requesting uplink timing alignment from the network, which grants the wireless device a limited duration of uplink timing alignment. The wireless device may then again request uplink timing alignment from the network. Due to congestion and the allocation of timeslots to other technologies, the wireless device may lose uplink timing alignment (once the grant for uplink timing alignment has expired) and be unable to request additional uplink timing alignment until an available timeslot, resulting in subframes where the wireless device is not in uplink timing alignment with the network. By maintaining a time alignment timer, the wireless device may be able to preemptively request additional uplink timing alignment, thereby reducing or eliminating the time that the wireless device is not in uplink timing alignment.

In the following description, for reasons of conciseness and clarity, terminology associated with the Long Term Evolution (LTE) standards, as promulgated under the 3rd Generation Partnership Project (3GPP) by the International Telecommunication Union (ITU), is used. It should be noted that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a wireless device can sometimes be called a user equipment, a mobile station, a mobile terminal, a subscriber unit, an access terminal, etc., to name just a few. Likewise, a base station can sometimes be called an access point, a Node B, an evolved Node B, and so forth. It should be noted that different terminologies apply to different technologies when applicable.

Figure 1:
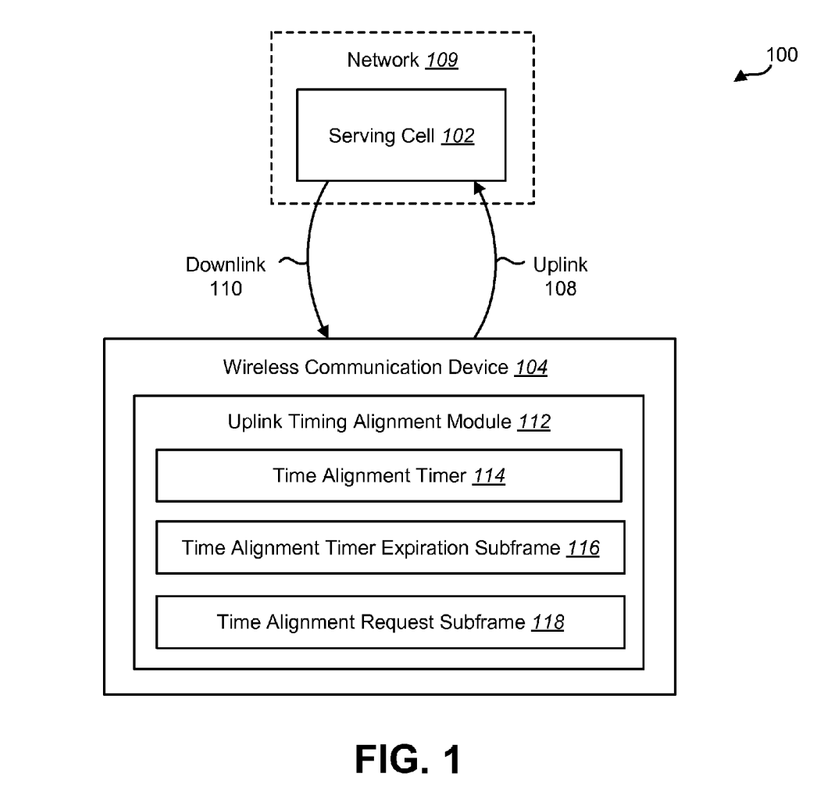
FIG. 1 shows a wireless communication system with multiple wireless devices.

FIG. 1 shows a wireless communication system 100 with multiple wireless devices. Wireless communication systems 100 are widely deployed to provide various types of communication content such as voice, data and so on. A wireless device may be a base station (as part of a serving cell 102) or a wireless communication device 104. A wireless communication device 104 may be configured to adaptively maintain uplink timing alignment with a network 109 (that includes the serving cell 102). More specifically, a wireless communication device 104 may be configured to preemptively request uplink timing alignment verification from the network 109 before the current uplink timing alignment expires. This may enable the wireless communication device 104 to synchronize timing with the network 109 in the soonest possible subframe (either before or after the expiration of the current uplink timing alignment). Benefits may be realized by reducing or eliminating the amount of time that the wireless communication device 104 is not time aligned with the network 109.

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

In 3GPP Long Term Evolution (LTE), a wireless communication device 104 may be referred to as a "user equipment"

(UE). A wireless communication device 104 may also be referred to as, and may include some or all of the functionality of, a terminal, an access terminal, a subscriber unit, a station, etc. A wireless communication device 104 may be a cellular phone, a personal digital assistant (PDA), a wireless device, a wireless modem, a handheld device, a laptop computer, etc.

A wireless communication device 104 may communicate with zero, one or multiple base stations on the downlink 110 and/or uplink 108 at any given moment. The downlink 110 (or forward link) refers to the communication link from a serving cell 102 (via a base station) to a wireless communication device 104, and the uplink 108 (or reverse link) refers to the communication link from a wireless communication device 104 to a serving cell 102 (via a base station).

The wireless communication system 100 may support time division duplex (TDD) and/or frequency division duplex (FDD). In a time division duplex (TDD) system, uplink and downlink transmissions are in the same frequency region, allowing the estimation of the downlink 110 channel from the uplink 108 channel (and vice versa) using the reciprocity principal. In a time division duplex (TDD) system, a wireless device may either transmit or receive (but not both) during designated timeslots. In a frequency division duplex (FDD) system, the transmitter and receiver may operate using different carrier frequencies.

A base station is a station that communicates with one or more wireless communication devices 104. A base station may also be referred to as, and may include some or all of the functionality of, an access point, a broadcast transmitter, a NodeB, an evolved NodeB, etc. The term "base station" will be used herein. Each base station provides communication coverage for a particular geographic area. A base station may provide communication coverage for one or more wireless communication devices 104. The term "cell" can refer to a base station and/or its coverage area, depending on the context in which the term is used. The wireless communication system 100 may include a serving cell 102. The serving cell 102 may include one or more base stations.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized. The wireless communication system 100 may utilize MIMO. A MIMO system may support both time division duplex (TDD) and frequency division duplex (FDD) systems.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2).

Long Term Evolution (LTE) Release 9 provides support for evolved Multicast Broadcast Multimedia Service (eMBMS) in the Long Term Evolution (LTE) air interface using the Multimedia Broadcast over a Single Frequency Network (MBSFN) infrastructure. The Multimedia Broadcast over a Single Frequency Network (MBSFN) infrastructure is discussed in additional detail below in relation to FIG. 2.

The wireless communication device 104 may include an uplink timing alignment module 112. The uplink timing alignment module 112 may allow the wireless communication device 104 to obtain and maintain timing alignment with the network 109. The uplink timing alignment module 112 may include a time alignment timer 114. The time alignment timer 114 may control how long the wireless communication device 104 is considered uplink time aligned with the network 109. Thus, when the time alignment timer 114 is running, the wireless communication device 104 is uplink time aligned with the network 109. When the time alignment timer 114 expires, the wireless communication device 104 is no longer uplink time aligned with the network 109. To return to being uplink time aligned with the network 109, the wireless communication device 104 may first request timing alignment from the network 109 (during an uplink subframe), next receive a timing alignment command (also referred to as a timing advance command) from the network 109 (during a downlink subframe) and finally update the uplink timing alignment settings and restart the time alignment timer 114.

As described in 3GPP TS 36.321 version 10.5.0 Release 10 (ETSI TS 136 321 V10.5.0 (2012-03)), a wireless communication device 104 may include a time alignment timer 114 referred to as timeAlignmentTimer. To synchronize uplink timing with the network 109, the wireless communication device 104 may receive a timing alignment command in a media access control (MAC) control element. When a timing alignment command is received, the wireless communication device 104 may apply the timing alignment command and start/restart the time alignment timer 114.

In one configuration, the wireless communication device 104 may receive a timing alignment command in a random access response (RAR) message. When a timing alignment command is received in a random access response (RAR) message, the wireless communication device 104 may determine if the random access preamble was selected by the media access control (MAC) layer. If the random access preamble was not selected by the media access control (MAC) layer, the wireless communication device 104 may determine whether the time alignment timer 114 is currently running. If the time alignment timer 114 is not currently running, the wireless communication device 104 may apply the timing alignment command and start the time alignment timer 114. If the contention resolution is considered not successful (as described in subclause 5.1.5), the wireless communication device 104 may stop the time alignment timer 114. If the random access preamble was selected by the media access control (MAC) layer and the time alignment timer 114 is running, the wireless communication device 104 may ignore the received timing alignment command. If the random access preamble was not selected by the media access control (MAC), the wireless communication device 104 may apply the timing alignment command and start/restart the time alignment timer 114.

When the time alignment timer 114 expires, the wireless communication device 104 may flush all hybrid automatic repeat request (HARQ) buffers, notify the radio resource control (RRC) layer to release the physical uplink control channel (PUCCH) resources and sounding reference signal (SRS) resources, and clear any configured downlink assignments and uplink grants.

In 3GPP TS 36.321 version 10.5.0 Release 10, it specifies that the wireless communication device 104 may not perform any uplink transmission except a random access preamble transmission when the time alignment timer 114 is not running. Thus, if the time alignment timer 114 is expired, the wireless communication device 104 may be required to synchronize uplink timing with the network 109 before the wireless communication device 104 can transmit uplink data. In both a frequency division duplex (FDD) system and a time division duplex (TDD) system, the timing alignment command may only be received from the network 109 during downlink subframes in active time that are not already dedicated to other services (such as to Multimedia Broadcast over a Single Frequency Network (MBSFN)) and when measurement gaps are not configured.

If the wireless communication device 104 has pending data in a media access control (MAC) buffer and a timing alignment command has not been received when the time alignment timer 114 expires, the wireless communication device 104 may trigger a random access channel (RACH) procedure at the expiration of the time alignment timer 114 to send the pending uplink data. This is because physical uplink control channel (PUCCH) resources are released and configured uplink grants are cleared when the time alignment timer 114 expires. In response to the random access channel (RACH) procedure, the network 109 may send a timing alignment command to the wireless communication device 104 (i.e., in a random access response (RAR) protocol data unit (PDU) (MSG 2)).

In some configurations, where Multimedia Broadcast over a Single Frequency Network (MBSFN) or measurement gaps are configured, the wireless communication device 104 may have no opportunity to receive a timing alignment command from the network 109 for the duration of the Multimedia Broadcast over a Single Frequency Network (MBSFN) subframes or measurement gaps. Thus, the wireless communication device 104 may know beforehand that the time alignment timer 114 will expire without any opportunities for the wireless communication device 104 to request and receive a timing alignment command from the network 109. For time division duplex (TDD) systems, potential downlink 110 opportunities for receiving a timing alignment command from the network 109 are even more constrained. For example, in time division duplex (TDD) systems with Multimedia Broadcast over a Single Frequency Network (MBSFN) or time division duplex (TDD) systems with measurement gaps (+MBSFN), there may be many scenarios where the time alignment timer 114 is set to expire and the wireless communication device 104 knows ahead of time that a timing alignment command cannot be received from the network 109 prior to the expiration of the time alignment timer 114.

Because the wireless communication device 104 knows beforehand when the time alignment timer 114 will expire (i.e., the time alignment timer expiration subframe 116) and because the wireless communication device 104 is aware of Multimedia Broadcast over a Single Frequency Network (MBSFN) dedicated subframes and/or measurement gaps, the wireless communication device 104 can pre-trigger the random access channel (RACH) procedure at the earliest opportunity prior to (or after) the time alignment timer expiration subframe 116 (referred to as a time alignment request subframe 118). By sending a time alignment request in the time alignment request subframe 118, the wireless communication device 104 can maintain continuous uplink timing alignment with the network 109 or minimize delays between synchronization with the network 109.

Figure 2:
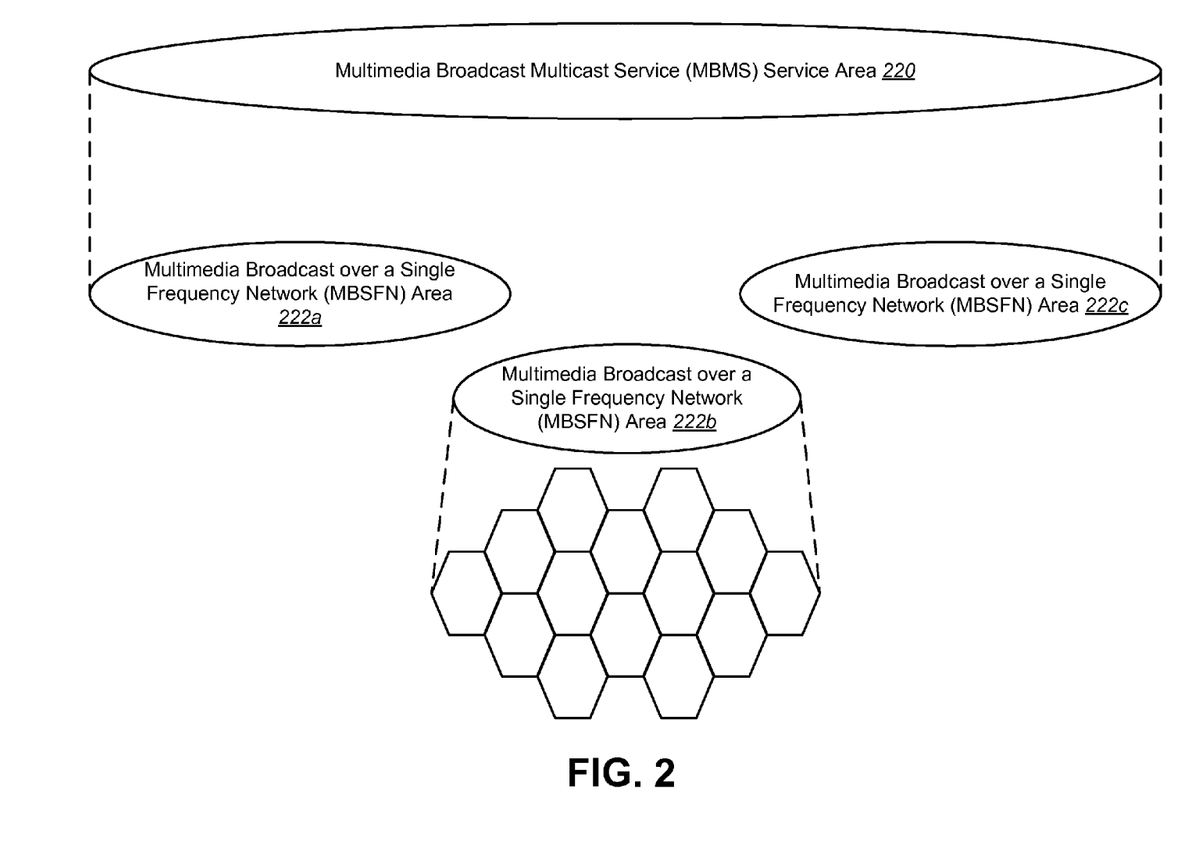
FIG. 2 illustrates a Multimedia Broadcast over a Single Frequency Network (MBSFN) infrastructure.

FIG. 2 illustrates a Multimedia Broadcast over a Single Frequency Network (MBSFN) infrastructure. The Multimedia Broadcast over a Single Frequency Network (MBSFN) infrastructure may include a Multimedia Broadcast Multicast Service (MBMS) service area 220, which is the area with evolved Multicast Broadcast Multimedia Service (eMBMS) service. The Multimedia Broadcast Multicast Service (MBMS) service area 220 may be divided into one or more Multimedia Broadcast over a Single Frequency Network (MBSFN) areas 222a-c. Each Multimedia Broadcast over a Single Frequency Network (MBSFN) area 222 may include multiple base stations (e.g., eNBs) that can synchronously transmit the same evolved Multicast Broadcast Multimedia Service (eMBMS) contents. Each Multimedia Broadcast over a Single Frequency Network (MBSFN) area 222 can be used to broadcast the venue, regional contents and national contents. One Long Term Evolution (LTE) cell can support a maximum of eight Multimedia Broadcast over a Single Frequency Network (MBSFN) areas 222. For in-venue broadcast, the size of a Multimedia Broadcast over a Single Frequency Network (MBSFN) area 222 may be as small as one cell or as large as hundreds of cells.

The base stations of each Multimedia Broadcast over a Single Frequency Network (MBSFN) area 222 may transmit Multicast Traffic Channels (MTCHs) and Multicast Control Channels (MCCHs) at the same time. Therefore, the wireless communication device 104 can combine signals broadcast from different base stations (similar to a soft handoff).

Figure 3:
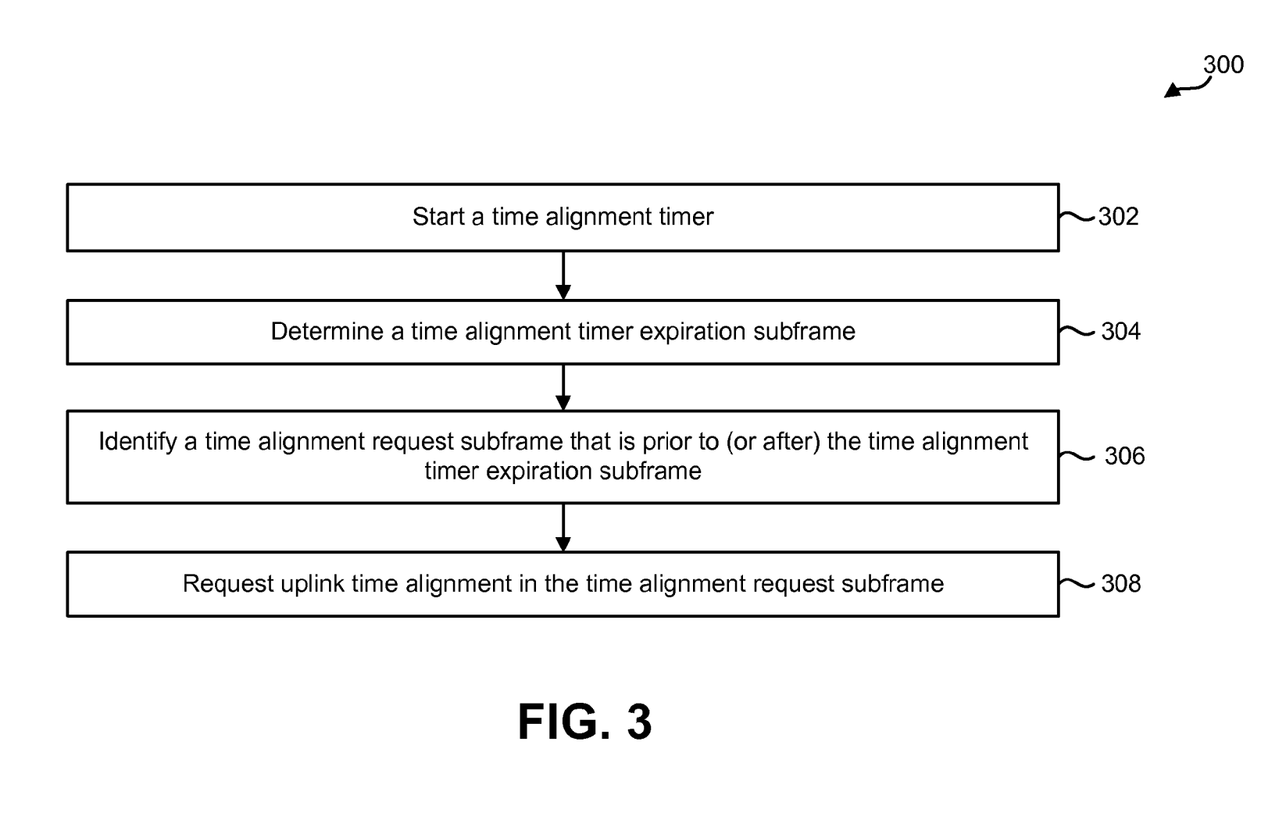
FIG. 3 is a flow diagram of a method for maintaining uplink time alignment.

FIG. 3 is a flow diagram of a method 300 for maintaining uplink time alignment. The method 300 may be performed by a wireless communication device 104. The wireless communication device 104 may start 302 a time alignment timer 114. As discussed above, while the time alignment timer 114 is running, the wireless communication device 104 is considered to be uplink time aligned with the network 109. The wireless communication device 104 may determine 304 a time alignment timer expiration frame 116 (i.e., the subframe when the time alignment timer 114 will expire).

The wireless communication device 104 may identify 306 a time alignment request subframe 118 that is prior to (or after) the time alignment timer expiration subframe 116. For example, the wireless communication device 104 may identify a subframe prior to the time alignment timer 114 expiration that allows for uplink transmission (an uplink subframe in a time division duplex (TDD) system or an uplink/downlink subframe in a frequency division duplex (FDD) system). In one configuration, the identified time alignment request subframe 118 may be sufficiently prior to the time alignment timer expiration subframe 116 such that the network 109 also has an opportunity (e.g., an open downlink subframe) to transmit a time alignment command to the wireless communication device 104 prior to the expiration of the time alignment timer 114. The wireless communication device 104 may then request 308 uplink time alignment in the time alignment request subframe 118. For example, the wireless communication device 104 may initiate a random access channel (RACH) procedure in the time alignment request subframe 118.

Figure 4:
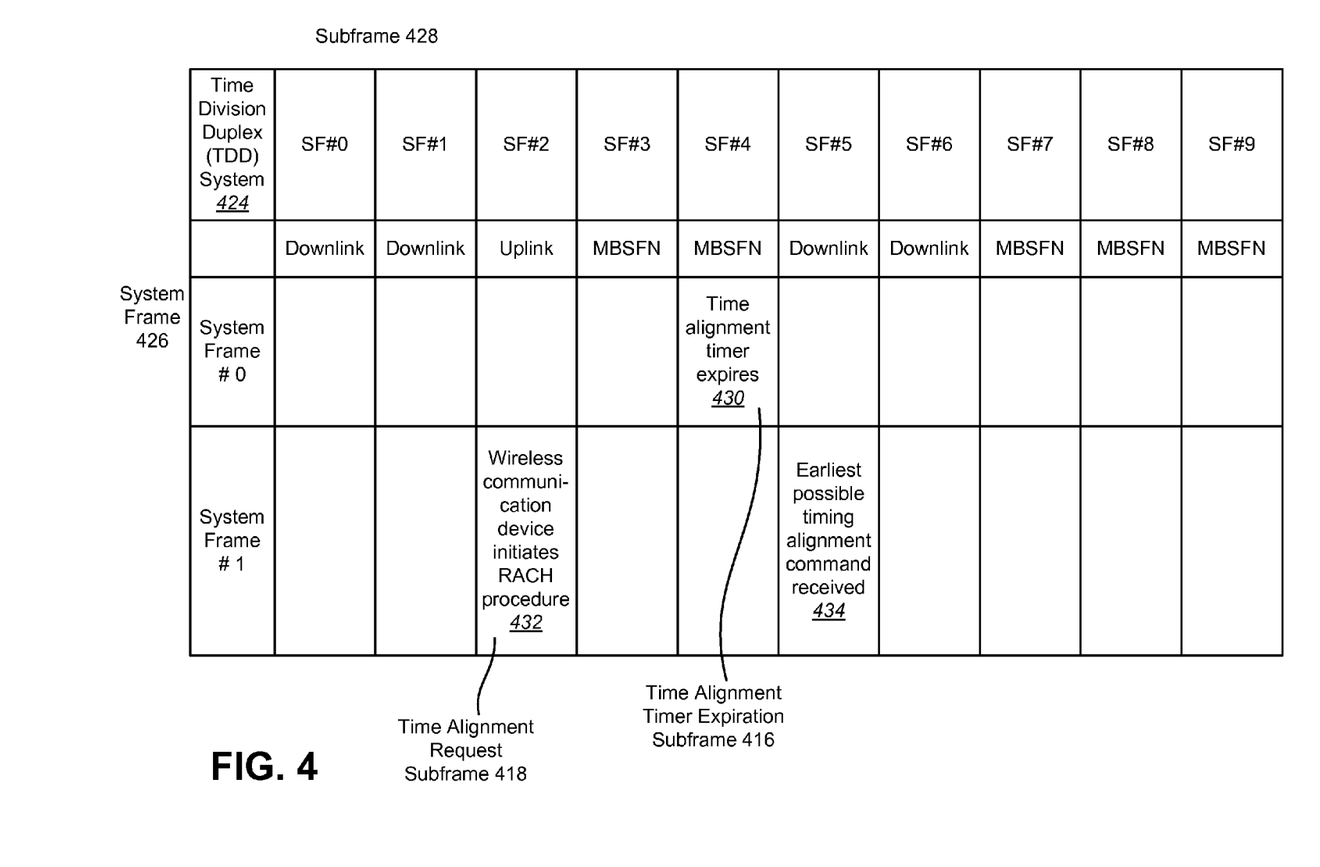
FIG. 4 illustrates exemplary time division duplex (TDD) system frames.

FIG. 4 illustrates exemplary time division duplex (TDD) system 424 frames. Each system frame 426 may include multiple subframes 428. Each subframe 428 of the system frames 426 may be dedicated to specific services. For example, the subframes SF#0, SF#1, SF#5 and SF#6 may be dedicated to downlink transmissions while the subframe SF#2 is dedicated to uplink transmissions. As another example, the subframes SF#3, SF#4, SF#7, SF#8 and SF#9 may be dedicated to Multimedia Broadcast over a Single Frequency Network (MBSFN) transmissions. This means that a wireless communication device 104 can only initiate a random access channel (RACH) procedure during subframe SF#2 of each system frame 426. Likewise, this means that the network 109 can only provide a timing alignment command to the wireless communication device 104 during the subframes SF#0, SF#1, SF#5 or SF#6.

In this example, the time alignment timer 114 expires 430 in subframe SF#4 of system frame #0 (i.e., the time alignment timer expiration subframe 416). Because the subframes SF#4, SF#5, SF#6, SF#7, SF#8, SF#9 of system frame #0 and the subframes #SF0 and SF#1 of system frame #1 are designated for downlink transmissions or Multimedia Broadcast over a Single Frequency Network (MBSFN) transmissions, the wireless communication device 104 may have to delay for eight subframes 428 before initiating 432 a random access channel (RACH) procedure to request uplink timing alignment from the network 109 (i.e., during a time alignment request subframe 418). Furthermore, the wireless communication device 104 may not receive 434 a timing alignment command from the network 109 until subframe SF#5 of system frame #1, which is the earliest available downlink subframe after the wireless communication device 104 requests uplink timing alignment. Thus, the wireless communication device 104 may wait eleven subframes 428 after the time alignment timer 114 expires 430 before returning to uplink time alignment with the network 109. During those eleven subframes 428, the wireless communication device 104 may be unable to perform any uplink transmissions except the random access preamble transmission.

Figure 5:
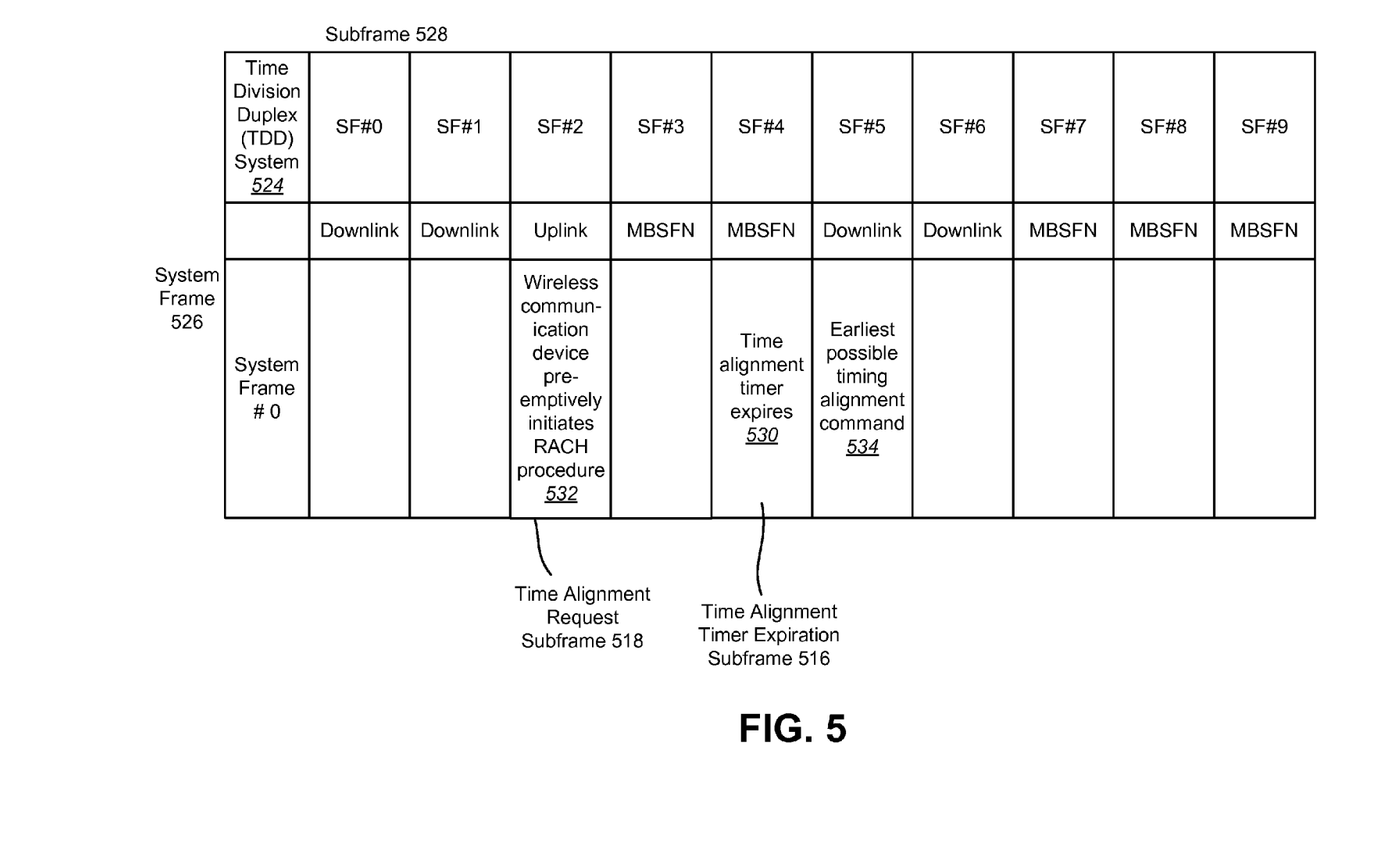
FIG. 5 illustrates additional exemplary time division duplex (TDD) system frames.

FIG. 5 illustrates additional exemplary time division duplex (TDD) system 524 frames. Each system frame 526 may include multiple subframes 528. Each subframe 528 of the system frames 526 may be dedicated to specific services. For example, the subframes SF#0, SF#1, SF#5 and SF#6 may be dedicated to downlink transmissions while the subframe SF#2 is dedicated to uplink transmissions. As another example, the subframes SF#3, SF#4, SF#7, SF#8 and SF#9 may be dedicated to Multimedia Broadcast over a Single Frequency Network (MBSFN) transmissions. This means that a wireless communication device 104 can only initiate a random access channel (RACH) procedure during subframe SF#2 of each system frame 526. Likewise, this means that the network 109 can only provide a timing alignment command to the wireless communication device 104 during the subframes SF#0, SF#1, SF#5 or SF#6.

In this example, the time alignment timer 114 expires 530 in subframe SF#4 of system frame #0 (i.e., the time alignment timer expiration subframe 516). However, the wireless communication device 104 is aware of the subframe 528 when the time alignment timer 114 expires 530. Therefore, the wireless communication device 104 may preemptively initiate 532 a random access channel (RACH) procedure in the subframe SF#2 of system frame #0 (i.e., the time alignment request subframe 518), prior to the expiration 530 of the time alignment timer 114. In one configuration, the time alignment request subframe 518 may be the last uplink subframe preceding the expiration 530 of the time alignment timer 114. After the time alignment timer 114 expires 530 in the subframe SF#4, the network 109 may transmit a timing alignment command in the subframe SF#5 (referred to as the earliest possible timing alignment command 534), which is the earliest possible subframe 528 that the network 109 can transmit a timing alignment command. Thus, in this configuration the wireless communication device 104 waits for only one subframe 528 after the time alignment timer 114 expires 530 before returning to uplink time alignment with the network 109. Due to real network conditions, the network 109 may delay additional subframes 528 before transmitting the timing alignment command.

Figure 6:
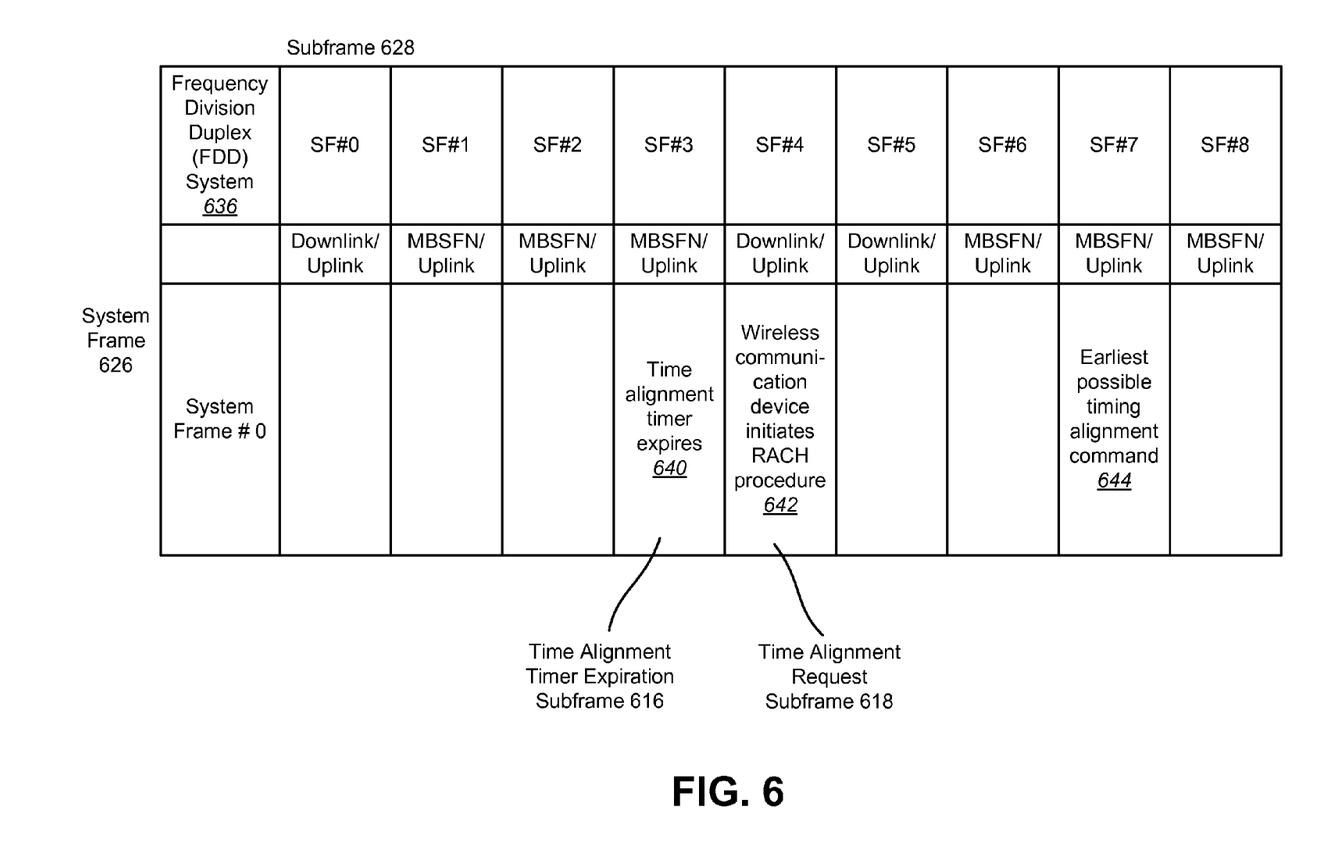
FIG. 6 illustrates exemplary frequency division duplex (FDD) system frames.

FIG. 6 illustrates exemplary frequency division duplex (FDD) system 636 frames. Each system frame 626 may include multiple subframes 628. Each subframe 628 of the system frames 626 may be dedicated to specific services. For example, the subframes SF#0, SF#4 and SF#5 may be dedicated to uplink/downlink transmissions while the subframes SF#1, SF#2, SF#3, SF#6, SF#7 and SF#8 be dedicated to Multimedia Broadcast over a Single Frequency Network (MBSFN) transmissions and uplink transmissions. This means that a wireless communication device 104 can initiate a random access channel (RACH) procedure during any of the subframes 628 of each system frame 626 but the network 109 can only provide a timing alignment command to the wireless communication device 104 during the subframes SF#0, SF#4 and SF#5.

In this example, the time alignment timer 114 expires 640 in subframe SF#3 of system frame #0 (referred to as the time alignment timer expiration subframe 616). The wireless communication device 104 may initiate 642 a random access channel (RACH) procedure to request uplink timing alignment from the network 109 in the subframe SF#4 (referred to as the time alignment request subframe 618). Assuming the best possible scenario, the wireless communication device 104 may receive 644 a timing alignment command from the network 109 in subframe SF#7 of system frame #0. Thus, the wireless communication device 104 may wait three subframes 628 after the time alignment timer 114 expires 640 before returning to uplink time alignment with the network 109. During those three subframes 628, the wireless communication device 104 may be unable to perform any uplink transmissions except the random access preamble transmission.

Figure 7:
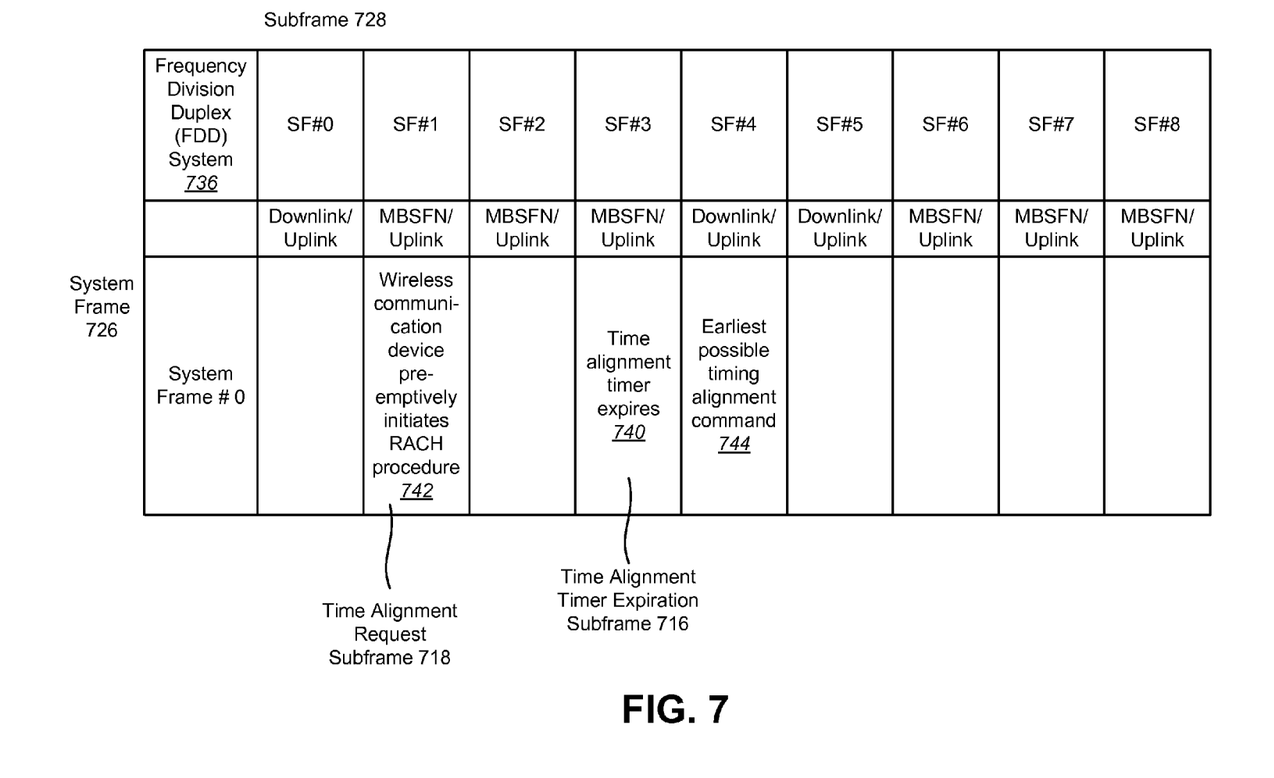
FIG. 7 illustrates additional exemplary frequency division duplex (FDD) system frames.

FIG. 7 illustrates additional exemplary frequency division duplex (FDD) system 736 frames. Each system frame 726 may include multiple subframes 728. Each subframe 728 of the system frames 726 may be dedicated to specific services. For example, the subframes SF#0, SF#4 and SF#5 may be dedicated to uplink/downlink transmissions while the subframes SF#1, SF#2, SF#3, SF#6, SF#7 and SF#8 be dedicated to Multimedia Broadcast over a Single Frequency Network (MBSFN) transmissions and uplink transmissions. This means that a wireless communication device 104 can initiate a random access channel (RACH) procedure during any of the subframes 728 of each system frame 726 but the network 109 can only provide a timing alignment command to the wireless communication device 104 during the subframes SF#0, SF#4 and SF#5.

In this example, the time alignment timer 114 expires 740 in subframe SF#3 of system frame #0 (i.e., the time alignment timer expiration subframe 716). However, the wireless communication device 104 is aware of the subframe 728 when the time alignment timer 114 expires 740. Therefore, the wireless communication device 104 may preemptively initiate 742 a random access channel (RACH) procedure in the subframe SF#1 of system frame #0 (i.e., the time alignment request subframe 718), prior to the expiration 740 of the time alignment timer 114. Thus, after the time alignment timer 114 expires 740 in the subframe SF#3, the network 109 may transmit 744 a timing alignment command in the subframe SF#4, which is the earliest possible subframe 728 that the network 109 can transmit a timing alignment command. In this configuration, the wireless communication device 104 waits for only one subframe 728 after the time alignment timer 114 expires 740 before returning to uplink time alignment with the network 109 (resulting in a saving of 3 milliseconds (ms) assuming the most optimistic network 109 delays). Due to real network conditions, the use of a preemptive random access channel (RACH) procedure may result in savings of more than 3 ms.

Figure 8:
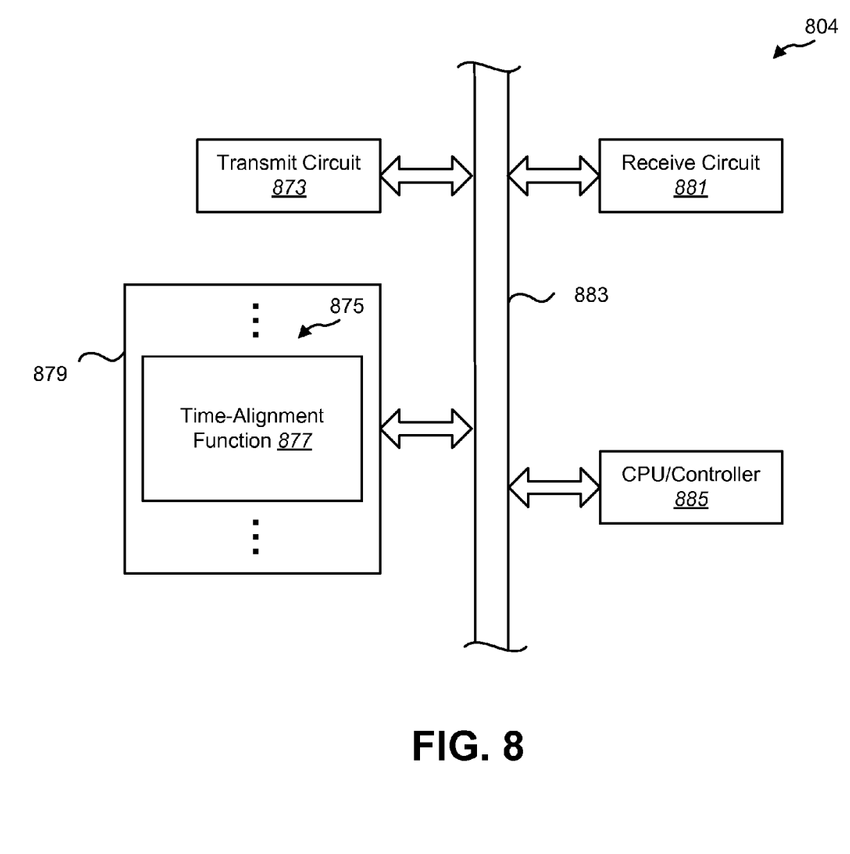
FIG. 8 shows part of a hardware implementation of an apparatus for executing the time alignment methods described herein.

FIG. 8 shows part of a hardware implementation of an apparatus 804 for executing the schemes or processes as described above. The apparatus 804 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 8.

In this embodiment, the circuit apparatus is signified by the reference numeral 804 and can be implemented in a wireless communication device 104 or user equipment (UE) described.

The apparatus 804 comprises a central data bus 883 linking several circuits together. The circuits include a CPU (Central Processing Unit) or a controller 885, a receive circuit 881, a transmit circuit 873, and a memory unit 879.

The receive circuit 881 and the transmit circuit 873 can be connected to an RF (Radio Frequency) circuit (which is not shown in the drawing). The receive circuit 881 processes and buffers received signals before sending the signals out to the data bus 883. On the other hand, the transmit circuit 873 processes and buffers the data from the data bus 883 before sending the data out of the apparatus 804. The CPU/controller 885 performs the function of data management of the data bus 883 and furthers the function of general data processing, including executing the instructional contents of the memory unit 879.

The memory unit 879 includes a set of modules and/or instructions generally signified by the reference numeral 875. In this embodiment, the modules/instructions include, among other things, a time-alignment function 877 which carries out the schemes and processes as described above. The function 877 includes computer instructions or code for executing the process steps as shown and described in FIGS. 1-7. Specific instructions particular to an entity can be selectively implemented in the function 877. For instance, if the apparatus 804 is part of a wireless communication device 104, among other things, instructions particular to the wireless communication device 104, as shown and described in FIGS. 1-7 can be coded in the function 877.

In this embodiment, the memory unit 879 is a RAM (Random Access Memory) circuit. The exemplary functions, such as the function 877, include one or more software routines, modules and/or data sets. The memory unit 879 can be tied to another memory circuit (not shown) which can either be of the volatile or nonvolatile type. As an alternative, the memory unit 879 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Bluray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus configured for wireless communication, comprising:
    means for starting a time alignment timer;
    means for determining when the time alignment timer will expire;
    means for identifying a time alignment request subframe that is prior to the time alignment timer expiring on a condition that a timing alignment command cannot be received before the time alignment timer expires, which is determined based on a multimedia broadcast over a single frequency network subframe configuration or a measurement gap configuration; and
    means for requesting uplink time alignment in the time alignment request subframe.

2. The apparatus of claim 1, wherein the time alignment request subframe is a last uplink subframe preceding the expiration of the time alignment timer.

3. The apparatus of claim 1, wherein the apparatus operates in a multicast broadcast over a single frequency network.

4. The apparatus of claim 1, further comprising means for receiving the timing alignment command.

5. The apparatus of claim 4, wherein the timing alignment command is received in a random access response protocol data unit.

6. The apparatus of claim 1, wherein the timing alignment command is received in a first downlink subframe following the expiration of the time alignment timer.

7. The apparatus of claim 1, wherein the uplink time alignment is requested using a random access channel procedure.

8. The apparatus of claim 1, wherein the apparatus is operating in a time division duplex system.

9. The apparatus of claim 1, wherein the apparatus is operating in a frequency division duplex system.

10. An apparatus, comprising:
    circuitry configured to start a time alignment timer, to determine when the time alignment timer will expire, to identify a time alignment request subframe that is prior to the time alignment timer expiring on a condition that a timing alignment command cannot be received before the time alignment timer expires, which is determined based on a multimedia broadcast over a single frequency network subframe configuration or a measurement gap configuration, and to request uplink time alignment in the time alignment request subframe.

11. The apparatus of claim 10, wherein the time alignment request subframe is a last uplink subframe preceding the expiration of the time alignment timer.

12. The apparatus of claim 10, wherein the apparatus operates in a multicast broadcast over a single frequency network.

13. The apparatus of claim 10, further comprising circuitry configured to receive the timing alignment command.

14. The apparatus of claim 13, wherein the timing alignment command is received in a random access response protocol data unit.

15. The apparatus of claim 10, wherein the timing alignment command is received in a first downlink subframe following the expiration of the time alignment timer.

16. The apparatus of claim 10, wherein the uplink time alignment is requested using a random access channel procedure.

17. The apparatus of claim 10, wherein the apparatus is operating in a time division duplex system.

18. The apparatus of claim 10, wherein the apparatus is operating in a frequency division duplex system.

19. A method for wireless communication, comprising:
    starting a time alignment timer;
    determining when the time alignment timer will expire;
    identifying a time alignment request subframe that is prior to the time alignment timer expiring on a condition that a timing alignment command cannot be received before the time alignment timer expires, which is determined based on a multimedia broadcast over a single frequency network subframe configuration or a measurement gap configuration; and
    requesting uplink time alignment in the time alignment request subframe.

20. The method of claim 19, wherein the time alignment request subframe is a last uplink subframe preceding the expiration of the time alignment timer.

21. The method of claim 19, wherein the method is performed in a multicast broadcast over a single frequency network.

22. The method of claim 19, further comprising receiving a timing alignment command.

23. The method of claim 22, wherein the timing alignment command is received in a random access response protocol data unit.

24. The method of claim 19, wherein the timing alignment command is received in a first downlink subframe following the expiration of the time alignment timer.

25. The method of claim 19, wherein the uplink time alignment is requested using a random access channel procedure.

26. The method of claim 19, wherein the method is performed in a time division duplex system.

27. The method of claim 19, wherein the method is performed in a frequency division duplex system.

28. A non-transitory computer-readable medium having instructions thereon, the instructions comprising:
    code for causing a wireless device to start a time alignment timer;
    code for causing the wireless device to determine when the time alignment timer will expire;
    code for causing the wireless device to identify a time alignment request subframe that is prior to the time alignment timer expiring on a condition that a timing alignment command cannot be received before the time alignment timer expires, which is determined based on a multimedia broadcast over a single frequency network subframe configuration or a measurement gap configuration; and
    code for causing the wireless device to request uplink time alignment in the time alignment request subframe.

29. The non-transitory computer-readable medium of claim 28, wherein the time alignment request subframe is a last uplink subframe preceding the expiration of the time alignment timer.

30. The non-transitory computer-readable medium of claim 28, wherein the wireless device operates in a multicast broadcast over a single frequency network.

31. The non-transitory computer-readable medium of claim 28, further comprising code for causing the wireless device to receive a timing alignment command.

* * * * *